Figure 1:
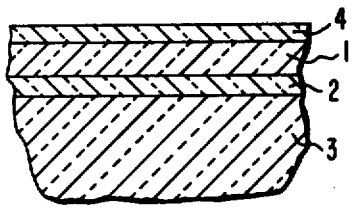

United States Patent [19]

Isaacs et al.

[11] 4,183,617
[45] Jan. 15, 1980

[54] THIN FILM AS$_2$S$_5$ OPTICAL WAVE GUIDE

[75] Inventors: Thelma J. Isaacs, Murrysville; Milton Gottlieb, Churchill Borough, both of Pa.

[73] Assignee: Westinghouse Electric Corp., Pittsburgh, Pa.

[21] Appl. No.: 876,398

[22] Filed: Feb. 9, 1978

[51] Int. Cl.$^2$ .......................... G02B 5/14; B01J 27/02
[52] U.S. Cl. ............................. 350/96.12; 350/96.34; 252/439
[58] Field of Search ............... 350/96.12, 96.13, 96.14, 350/96.34, 358; 252/439, 461

[56] References Cited
U.S. PATENT DOCUMENTS

| | | | |
|---|---|---|---|
| 3,406,358 | 10/1968 | Seidet et al. | 350/96.12 |
| 3,736,045 | 5/1973 | Heidrich | 350/96.13 |
| 3,904,270 | 9/1975 | Cheo | 350/96.13 |

OTHER PUBLICATIONS

K. W. Loh, et al., "Convolution Using Guided Acousto-Optical Interaction in As$_2$S$_3$ Waveguides," *Appl. Phys. Lett.*, vol. 28, No. 3, Feb. 1976, pp. 109-111.
"Refractive Index of Amorphous As$_2$S$_5$," *Chemical Abstracts*, vol. 71, No. 17187e, 1969.
A. Matsuda et al., "Stopping Effect" on Guided Light in As-S Films by a Laser Beam, *Appl. Phys. Lett.*, vol. 24, No. 7, Apr. 1974, pp. 314-315.
Y. Ohmachi, "Acousto-Optical Light Diffraction in Thin Films," *J. Appl. Phys.*, vol. 44, No. 9, Sep. 1973, pp. 3928-3933.

*Primary Examiner*—Rolf G. Hille
*Attorney, Agent, or Firm*—R. D. Fuerle

[57] ABSTRACT

An amorphous film of As$_2$S$_5$ on a substrate is disclosed for use in various optical applications. The film can be shaped as a lens to focus light. By mounting an acoustic transducer on the film to produce surface or bulk acoustic waves light moving in the film can be deflected or modulated respectively. The film can also be used in anti-reflective, high reflectivity, and photoconductive coatings.

31 Claims, 6 Drawing Figures

U.S. Patent        Jan. 15, 1980        4,183,617

THIN FILM AS$_2$S$_5$ OPTICAL WAVE GUIDE

BACKGROUND OF THE INVENTION

The new technology of integrated optics is expected in coming years to provide new devices for communications and signal processing, especially in conjunction with fiber optic transmission systems. Integrated optics is an attractive approach to these devices because there is the potential for very high performance operation using optical processing principles, in structures that can be very small and rigid, and manufactured by batch fabrication techniques.

One of the components required for integrated optic signal processing devices is an efficient modulator, capable of manipulating the intensity or position of the light beam at very high frequencies. There are many methods of modulating light in optical waveguides, including electro-optic, magneto-optic, and acousto-optic with acousto-optic surface waves. An advantage of a waveguide modulator based upon acousto-optic interactions is that there is a greater number of available film materials that can be used, while electro-optic or magneto-optic modulators have relatively few. Furthermore, many good acousto-optical films can be deposited upon a choice of substrates, in amorphous form. This makes possible the fabrication of hybrid integrated optic circuits, in which each component may be chosen to be made of a material which will optimize its function.

One known thin film wave guide material is As$_2$S$_3$. This material has a high acousto-optical figure of merit (i.e., it is very efficient in modulating or deflecting light with sound), but it does not transmit light in the very useful wavelength of 0.6328 microns, produced by the helium-neon laser.

SUMMARY OF THE INVENTION

We have discovered that As$_2$S$_5$, a known chemical compound, can be deposited as an amorphous thin film having very excellent optical properties. This is surprising since As$_2$S$_5$ is known to sublime and to decompose at 500° C. The scattering and absorption losses of As$_2$S$_5$ are lower than those of As$_2$S$_3$ films. The film is photoconductive and has a high acousto-optical figure of merit compared to many other thin film optical waveguide materials. The conditions required for the deposition of As$_2$S$_5$ films are less stringent than those required for the deposition of As$_2$S$_3$ films, which means the cost of preparation will be lower. It is also expected on theoretical grounds that As$_2$S$_5$ will be less lossy acoustically than As$_2$S$_3$, though this has not yet been experimentally established.

For optical applications the most important advantage of As$_2$S$_5$ films is that they are transmissive much farther into the visible range than are As$_2$S$_3$ films. Films of As$_2$S$_5$ transmit at from about 0.55 µm to beyond 5 µm, while films of As$_2$S$_3$ transmit only from 0.9 µm to 11 µm. In particular, As$_2$S$_5$ films transmit at 0.6328 microns, the wavelength of the helium-neon laser. The helium-neon laser is a very important commercial laser in optical transmission work and the discovery that As$_2$S$_5$ thin films can be prepared and are transmissive at that wavelength is significant to the advancement of applications involving the helium-neon laser.

DESCRIPTION OF THE INVENTION

Figure 2:
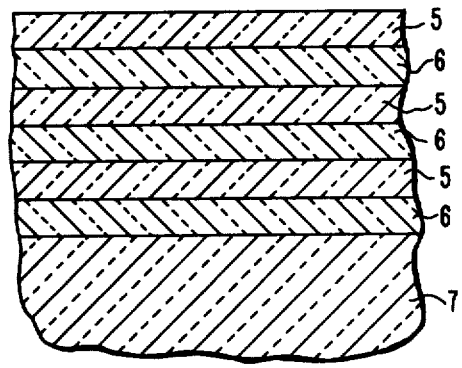
Figure 3:
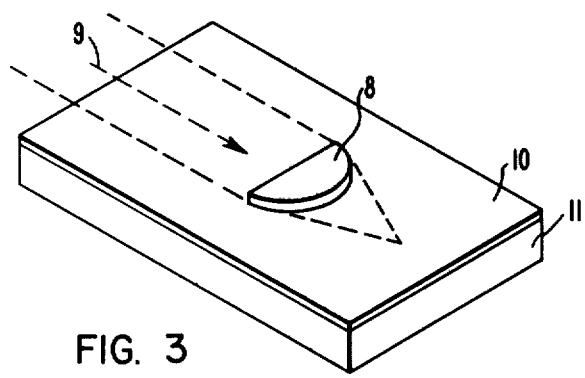
Figure 4:
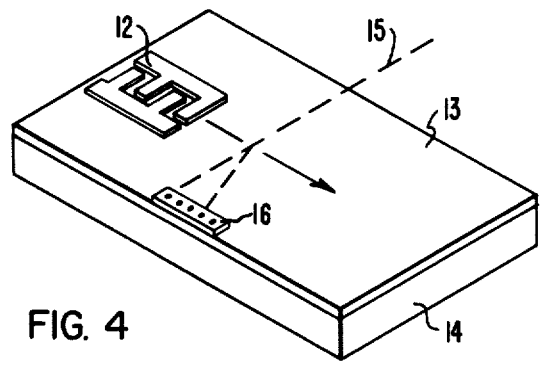
Figure 5:
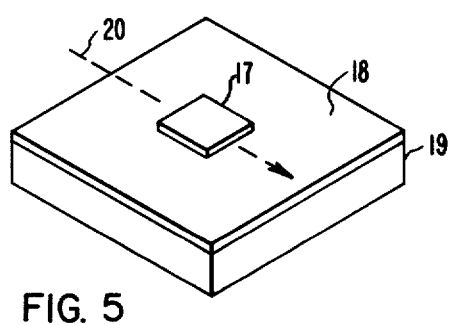
Figure 6:
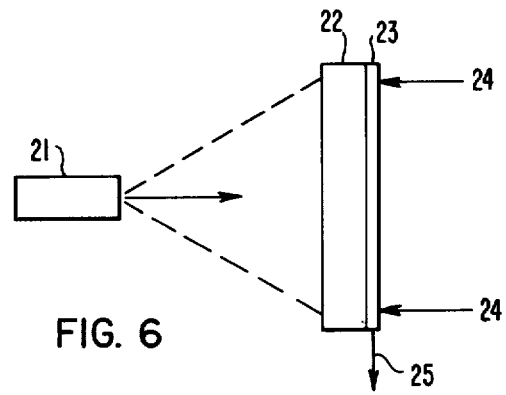

FIG. 1 is a side view in section of an anti-reflective coating;
FIG. 2 is a side view in section of a high-reflectivity coating (i.e., a mirror);
FIG. 3 is an isometric view of a waveguide lens;
FIG. 4 is an isometric view of an integrated optic spectrum analyzer or other signal processor or a surface wave acousto-optical waveguide modulator;
FIG. 5 is an isometric view of a bulk acoustic wave optical phase modulator; and
FIG. 6 is a diagrammatic view of the operational components of a vidicon tube.

In FIG. 1 a film 1 of As$_2$S$_5$ covers a second film 2 of a material having a lower refractive index than As$_2$S$_5$. The second film 2 is on a substrate 3 which may be glass (e.g., a lens) or other material. On top of film 1 is a third film 4 having a refractive index lower than films 1 and 2. To make the coating of the three films anti-reflective, films 2 and 4 are made one-fourth of a wavelength thick, and film 1 is made one-half of a wavelength thick. Light entering the coating is thereby prevented from being reflected back. The high index of refraction of As$_2$S$_5$ makes it very useful in this application. Materials suitable for films 2 and 4 are well known in the art. For example, CaF$_2$, MgF$_2$, or PbF$_2$ could be used.

In FIG. 2 layers 5 of As$_2$S$_5$ alternate with layers 6 of a material having a lower index of refraction such as CaF$_2$ to form a high reflectivity coating on substrate 7. At least one layer of each film is required for an anti-reflective coating and the greater the number of pairs of layers the greater will be the reflectivity. Each layer is one-half wavelength in thickness. Of course, all films must be transparent to the light; the substrate may also be transparent, depending on the application. Both the anti-reflective coating and the high reflectivity coating will be more effective the higher the index of refraction of the high index layer. The choice of such high index film materials transparent in the visible is extremely limited.

In FIG. 3 a lens 8 of As$_2$S$_5$, typically deposited through a mask, focuses light 9 moving through thin film optical waveguide 10 on substrate 11. The thin film optical waveguide has an index of refraction less than As$_2$S$_5$. Corning 7059 glass about 1 micron thick (depending on the design) may be used for waveguide 10. Substrates are typically of SiO$_2$. Very high index materials are particularly desirable for such lenses, and there are very few suitable materials which are transparent in the visible.

In FIG. 4 an interdigital surface wave acoustic transducer 12 generates a surface acoustic wave in thin film optical waveguide 13 of As$_2$S$_5$ on substrate 14. Light 15 moving in waveguide 13 at the appropriate Bragg angle, $\theta_B$, to the sound waves is deflected to various angles according to the frequency of the sound waves. The Bragg angle, $\theta_B$, is given by $$\theta_B = \sin^{-1} \lambda/\Lambda$$

where $\lambda$ is the light wavelength and $\Lambda$ is the sound wavelength. A detector array 16 consists of many detectors which detect light deflected at various angles. In this way a radio frequency signal driving transducer 12 can be analyzed. The As$_2$S$_5$ waveguide is particularly useful in this application because of its high acoustic-optical efficiency.

In FIG. 5 a bulk acoustic wave transducer 17 generates bulk acoustic waves which pass downward through As$_2$S$_5$ waveguide 18 and into substrate 19. Light 20 moving in waveguide 18 is modulated (i.e., undergoes a phase change) by interaction with the acoustic wave. The acoustic wave frequency in both the bulk and surface wave modulators (FIGS. 3 and 4) may be between 1 MHz and 10 GHz and the As$_2$S$_5$ waveguide thickness is typically about a micron though it may range from about 3000 Å to about 3 microns. The high acousto-optical efficiency of As$_2$S$_5$ also makes it particularly useful in this application.

In FIG. 6 an electron gun 21 scans As$_2$S$_5$ film 22 on electrically conducting glass 23. A light image 24 is projected on glass 23 which is transparent to the light. The As$_2$S$_5$ film is photoconductive, so when light is transmitted to the As$_2$S$_5$ film, it becomes conductive and permits electrons from the electron gun to pass to glass 23 thus generating a signal 25. In this way the light image is encoded on signal 25. NESA glass is commonly used as the conducting glass. The components shown in FIG. 6 are, of course, enclosed in an evacuated tube as is well known in the vidicon tube art.

The As$_2$S$_5$ compound may be prepared by weighing out stoichiometric amounts of arsenic and sulphur, and sealing these elements in evacuated silica-glass ampoules. The ampoules are placed in a split furnace and are heated to between about 480° to 500° C. and held at this temperature for a number of hours. They are shaken frequently during this period to promote homogeneity within the melt. When the run is completed, the ampoules are removed from the furnace and air cooled. The material thus formed is of a glassy nature.

Thin films of the As$_2$S$_5$ are prepared by thermal evaporation. A measured amount of the material is placed in a tantalum resistively heated boat, in a vacuum, and the As$_2$S$_5$ is brought to the glass softening point ($\sim$300° C.). The rate of evaporation for best quality films is less than 2500 Å per hour, and slower rates may be desirable. The material is stable and non-hygroscopic, but relatively soft and easily scratched. It can easily be polished to a good optical finish.

The following examples further illustrate this invention.

EXAMPLE 5.0417 grams of arsenic and 5.3942 grams of sulphur were weighed out and sealed under vacuum in a silica-glass tube. The tube was heated to approximately 500° C. in a split furnace. The melt was held at this temperature for 4 to 5 hours and agitated frequently. The ampoule was removed from the furnace and cooled.

To prepare a thin film 2 to 3 grams of As$_2$S$_5$ were placed in a tantalum resistively heated boat in a vacuum and were heated to about 300° C. After about 4 hours a film about 1 μm thick had formed. Repeating the procedure for different lengths of time produced films having thickness from about 0.5 to about 1.3 microns.

The acoustic and optical properties of waveguide films will generally depend strongly upon film thickness, so that the material properties are better specified by reference to bulk measurements. Bulk acoustic and optical measurements were made on a clear, uniform section of the melt, approximately 1 cm long. Refractive index measurements were made on a prism-shaped sample by the method of minimum deviation. The index between 0.577 μm and 5.3 μm is shown in the following table.

| λ (μm) | n |
|---|---|
| 0.5660 | 2.224 |
| 0.5770 | 2.150 |
| 0.5990 | 2.204 |
| 0.6328 | 2.199 |
| 0.6350 | 2.194 |
| 0.6580 | 2.186 |
| 1.554 | 2.145 |
| 2.66 | 2.130 |
| 3.38 | 2.128 |
| 5.3 | 2.119 |

The material is transmitting at higher or lower wavelengths, but was not tested beyond 5.3 μm.

The acoustic velocity was measured by the conventional pulse-ehco technique on a rod-shaped sample. Transducers were bonded with salol onto the rod ends, which were polished flat and parallel. Shear and longitudinal wave quartz transducers cut for 30 MHz were used. The measured longitudinal wave velocity is $2.22 \times 10^5$ cm/sec, and the measured shear wave velocity is $1.09 \times 10^5$ cm/sec.

These measurements may be used to estimate the acousto-optic figure of merit, M$_2$, of As$_2$S$_5$. The figure of merit is defined as $$M_2 = n^6 p^2 / \rho v^3,$$

in which n is the refractive index, p the photoelastic constant, $\rho$ the density, and v the acoustic velocity. The calculated value of the figure of merit, M$_2$, is 160 (relative to fused quartz. This value is larger than that of most good optical quality film materials.

Using similar procedures As$_2$S$_3$ was prepared as a compound and as a film and tested in the same manner. Preparation was more difficult because its lower vapor pressure makes deposition of high quality films more critically dependent on conditions of evaporation. The transmission range of As$_2$S$_3$ is given in the literature (Y. Ohmachi, Journal of Applied Physics 44, 3928 (1973)) as 0.9 to 11 microns and it was confirmed that As$_2$S$_3$ would not transmit at 0.6328 microns. Crystals of As$_2$S$_3$ are monoclinic and occur naturally as the mineral "orpiment." There does not appear to be a naturally occurring form of As$_2$S$_5$ and it apparently does not form a crystal.

We claim:

1. A coating comprising an amorphous film of As$_2$S$_5$ on a substrate, said film having an index of refraction of about
   2.224 at 0.5660 μm,
   2.150 at 0.5770 μm,
   2.204 at 0.5990 μm,
   2.199 at 0.6328 μm,
   2.194 at 0.6350 μm,
   2.186 at 0.6580 μm,
   2.145 at 1.554 μm,
   2.130 at 2.66 μm,
   2.128 at 3.38 μm, and
   2.119 at 5.3 μm.

2. A coating according to claim 1 wherein said film is about 3000 Å to about 3 microns thick.

3. A coating according to claim 1 in combination with a monochromatic light source having a wavelength at which said film is transmissive which directs monochromatic light into said film.

4. A coating according to claim 3 wherein said monochromatic light source has a wavelength of 0.6328 microns.

5. A coating according to claim 4 wherein said light source is a helium-neon laser.

6. A coating according to claim 3 in combination with a source of acoustic waves which propagate in or on said film.

7. A coating according to claim 6 wherein said acoustic waves have a frequency of about 1 MHz to about 10 GHz.

8. A coating according to claim 6 wherein said acoustic waves propagate approximately at the Bragg angle to said light.

9. A coating according to claim 8 wherein said source of acoustic waves is a surface wave acoustic transducer and said acoustic waves propagate on the surface of said film.

10. A coating according to claim 8 wherein said source of acoustic waves is a bulk acoustic wave transducer and said acoustic waves propagate approximately perpendicular to said film.

11. A coating according to claim 1 wherein said substrate comprises an underlying substrate having a film thereon of lower refractive index than said amorphous film of $As_2S_5$.

12. A coating according to claim 11 wherein said amorphous film of $As_2S_5$ has a third film on top of it, said third film having a refractive index lower than said other two films.

13. A coating according to claim 11 wherein layers of said amorphous film of $As_2S_5$ alternate with layers of said film of lower index of refraction.

14. A coating according to claim 11 wherein said amorphous film of $As_2S_5$ is in the shape of a lens.

15. A coating according to claim 1 wherein said substrate comprises an electrically conducting glass, in combination with an electron gun directed at said amorphous film of $As_2S_5$.

16. A method of transmitting light comprising
   (A) forming an amorphous film of $As_2S_5$ on a substrate, said film having an index of refraction of about
   2.224 at 0.5660 μm,
   2.150 at 0.5770 μm,
   2.204 at 0.5990 μm,
   2.199 at 0.6328 μm,
   2.194 at 0.6350 μm,
   2.186 at 0.6580 μm,
   2.145 at 1.554 μm,
   2.130 at 2.66 μm,
   2.128 at 3.38 μm, and
   2.119 at 5.3 μm; and
   (B) directing said light into said film.

17. A method according to claim 16 wherein said substrate comprises a waveguide film on a supporting substrate, said film of $As_2S_5$ is in the shape of a lens, and said light is focused by said lens.

18. A method according to claim 16 wherein said film is about 3000 Å to about 3 microns thick.

19. A method according to claim 16 wherein said light is monochromatic.

20. A method according to claim 19 wherein said light has a wavelength of 0.6328 microns.

21. A method according to claim 19 wherein said light is modulated by propagating acoustic waves in or on said film.

22. A method according to claim 21 wherein said acoustic waves have a frequency of about 1 MHz to about 10 GHz.

23. A method according to claim 21 wherein said acoustic waves are propagated approximately at the Bragg angle to said light.

24. A method according to claim 23 wherein said acoustic waves propagate on the surface of said film.

25. A method according to claim 23 wherein said acoustic waves propagate through said film.

26. A method according to claim 16 wherein said substrate comprises an underlying substrate having a film thereon of lower refractive index than said amorphous film of $As_2S_5$.

27. A method according to claim 26 wherein said amorphous film of $As_2S_5$ is in the shape of a lens.

28. A method according to claim 26 wherein said amorphous film of $As_2S_5$ has a third film on top of said other two films, said third film having an index of refraction lower than said other two films.

29. A method according to claim 26 wherein layers of said amorphous film of $As_2S_5$ alternate with layers of said film of lower index of refraction.

30. A method according to claim 16 wherein said substrate comprises an electrically conductive glass, including the step of directing a stream of electrons at said amorphous film of $As_2S_5$.

31. Amorphous $As_2S_5$ having an index of refraction of about
   2.224 at 0.5660 μm,
   2.150 at 0.5770 μm,
   2.204 at 0.5990 μm,
   2.199 at 0.6328 μm,
   2.194 at 0.6350 μm,
   2.186 at 0.6580 μm,
   2.145 at 1.554 μm,
   2.130 at 2.66 μm,
   2.128 at 3.38 μm, and
   2.119 at 5.3 μm.

* * * * *